United States Patent
Kishimoto et al.

(10) Patent No.: US 9,907,143 B2
(45) Date of Patent: Feb. 27, 2018

(54) LIGHTING CONTROL DEVICE, LIGHTING SYSTEM, AND PROGRAM

(71) Applicant: Panasonic Intellectual Property Management Co., Ltd., Osaka (JP)

(72) Inventors: Akihiro Kishimoto, Osaka (JP); Kentaro Yamauchi, Osaka (JP); Tatsumi Setomoto, Osaka (JP); Kohji Hiramatsu, Osaka (JP); Ryo Kawamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 30 days.

(21) Appl. No.: 15/017,051

(22) Filed: Feb. 5, 2016

(65) Prior Publication Data

US 2016/0262243 A1 Sep. 8, 2016

(30) Foreign Application Priority Data

Mar. 4, 2015 (JP) ................. 2015-043006

(51) Int. Cl.
*G06F 3/038* (2013.01)
*H05B 37/02* (2006.01)
*H04N 9/31* (2006.01)

(52) U.S. Cl.
CPC ....... *H05B 37/0227* (2013.01); *H04N 9/3155* (2013.01); *H04N 9/3179* (2013.01); *H04N 9/3182* (2013.01); *H04N 9/3194* (2013.01)

(58) Field of Classification Search
CPC ....... G09G 2320/0276; G09G 2360/16; G09G 2320/0626; G09G 3/3648; G09G 3/3611; G09G 2300/0842; G09G 3/3233; G09G 2300/0426; G09G 2300/0809; G09G 3/3688; G09G 2330/021; G09G 2310/027; G09G 5/006
See application file for complete search history.

(56) References Cited

U.S. PATENT DOCUMENTS

| | | | |
|---|---|---|---|
| 6,611,297 B1 | 8/2003 | Akashi et al. | |
| 7,262,813 B2 | 8/2007 | Sato | |
| 2005/0041164 A1 | 2/2005 | Sato | |
| 2014/0232764 A1* | 8/2014 | Nishio | G09G 3/3426 345/690 |
| 2015/0035763 A1* | 2/2015 | Matoba | G06F 3/0421 345/173 |

FOREIGN PATENT DOCUMENTS

| | | |
|---|---|---|
| JP | 2000-173783 A | 6/2000 |
| JP | 2003-097061 A | 4/2003 |
| JP | 2003-106650 A | 4/2003 |
| JP | 2005-057410 A | 3/2005 |
| JP | 2006-156416 A | 6/2006 |
| JP | 2008-185924 A | 8/2008 |
| JP | 2013-178400 A | 9/2013 |
| JP | 2014-060611 A | 4/2014 |

* cited by examiner

*Primary Examiner* — Minh D A
(74) *Attorney, Agent, or Firm* — Renner, Otto, Boisselle & Sklar, LLP

(57) ABSTRACT

A lighting control device which controls a lighting device, and includes: a feature quantity calculator which calculates a feature quantity of image content to be reproduced and projected by an image reproducing device; and a lighting controller which controls light emission of the lighting device based on the feature quantity calculated by the feature quantity calculator.

13 Claims, 7 Drawing Sheets

LIGHTING CONTROL DEVICE, LIGHTING SYSTEM, AND PROGRAM

CROSS REFERENCE TO RELATED APPLICATION

This application claims the benefit of priority of Japanese Patent Application Number 2015-043006 filed on Mar. 4, 2015, the entire content of which is hereby incorporated by reference.

BACKGROUND

1. Field of the Invention

The present disclosure relates to a lighting control device which controls a lighting device, and a lighting system including the lighting control device, the lighting device, and an image reproducing device.

2. Description of the Related Art

For instance, Japanese Unexamined Patent Application Publication No. 2003-97061 discloses a bathroom provided with an audio-visual means including: a bathroom; an audio-visual means placed for viewing and listening of images and sound in the bathroom; a bathroom illuminating means; and an illumination control means which controls illuminance of the bathroom illuminating means. According to the bathroom provided with the audio-visual means, the illumination control means controls the illuminance of the bathroom illuminating means in conjunction with actuation of the audio-visual means. This allows dimming of the illumination in the bathroom when a person views or listening to an image or sound.

SUMMARY

In recent years, space production has been carried out in, for example, indoor spaces such as retail premises, by reproducing an image (a still image or a moving image) using an image reproducing device such as a projector, or adjusting brightness or a color temperature of a lighting device.

When producing an illuminated space by both reproduction of an image and control of a lighting device, brightness, etc. of the image produced by the image reproducing device need to match brightness, etc. of light emitted by the lighting device, otherwise it is not possible to provide an illuminated space having unity. For that reason, for example, an operation of adjusting each of the image reproducing device and the lighting device and checking an illuminated space after adjustment is repeatedly carried out by an expert who is familiar with lighting design.

However, the person who adjusts the image reproducing device and the lighting device is not always an expert who is familiar with lighting design. Furthermore, separately adjusting the image reproducing device and the lighting device may possibly cause incoordination in the adjustment.

In view of the above-described conventional problems, the present disclosure provides a lighting control device and the like which enable easily forming an illuminated space suitable for an image reproduced by an image reproducing device.

A lighting control device according to an aspect of the present disclosure is a lighting control device which controls a lighting device. The lighting control device includes: a calculator which calculates a feature quantity of image content to be reproduced and projected by an image reproducing device; and a lighting controller which controls light emission of the lighting device based on the feature quantity calculated by the calculator.

In addition, a lighting system according to an aspect of the present disclosure includes a lighting control device, a lighting device, and an image reproducing device according to any of aspects of the present disclosure.

In addition, a program according to an aspect of the present disclosure is a program recorded on a non-transitory computer-readable recording medium for use in controlling a lighting device. The program causing a computer to execute: calculating a feature quantity of image content to be reproduced by an image reproducing device; and controlling light emission of the lighting device based on the feature quantity calculated in the calculating.

A lighting control device and the like according to the present disclosure enable easily forming an illuminated space suitable for an image reproduced by an image reproducing device.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments of the present disclosure will be described with reference to the drawings. It should be noted that the embodiments described below each indicate one specific example of the present disclosure. Thus, the numerical values, shapes, materials, constituent elements, the disposition and connection of the constituent elements, and others described in the following embodiments are mere examples, and do not intend to limit the present disclosure. Furthermore, among the constituent elements in the following embodiments, elements not recited in any one of the independent claims which indicate the broadest concepts of the present disclosure are described as arbitrary constituent elements.

In addition, each of the diagrams is a schematic diagram and thus is not necessarily strictly illustrated. In each of the diagrams, substantially the same constituent elements are assigned with the same reference signs, and there are instances where redundant descriptions are omitted or simplified.

Embodiment 1

The following describes a lighting system according to Embodiment 1.

Basic Configuration and Operation of a Lighting System

Figure 1:
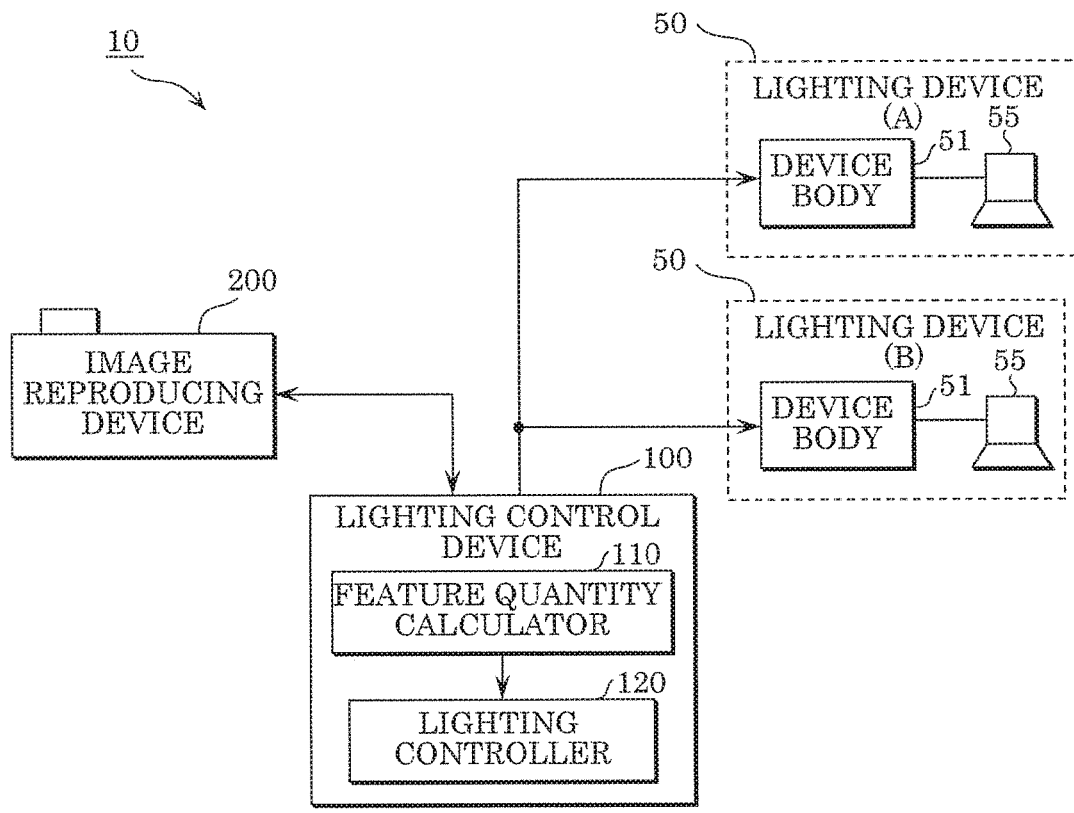
FIG. 1 is a diagram illustrating a basic configuration of a lighting system according to Embodiment 1.
Figure 2:
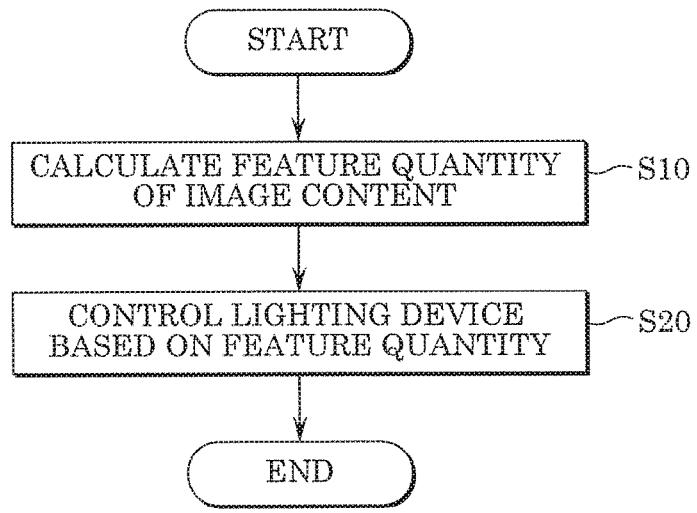
FIG. 2 is a diagram illustrating a flow of basic processes performed by a lighting control device according to Embodiment 1.

First, the following describes a basic configuration of a lighting system according to Embodiment 1 with reference to FIG. 1 and FIG. 2.

FIG. 1 is a diagram illustrating a basic configuration of lighting system 10 according to Embodiment 1. FIG. 2 is a diagram illustrating a flow of basic processes performed by lighting control device 100 included in lighting system 10 according to Embodiment 1.

As illustrated in FIG. 1, lighting system 10 according to Embodiment 1 includes lighting control device 100, lighting devices 50, and image reproducing device 200. According to the present embodiment, lighting system 10 includes two lighting devices 50 which are controlled by lighting control device 100. It should be noted that one of the two lighting devices 50 is labeled as "A" and the other is labeled as "B" to distinguish between the two lighting devices 50 in FIG. 1. The same holds for FIG. 3, FIG. 7, and FIG. 8 which will be described later.

Lighting devices 50 each include device body 51 and lamp 55 attached to device body 51. The two lighting devices 50 included in lighting system 10 are placed, for example, on a ceiling in a room where image reproducing device 200 projects image content.

Image reproducing device 200 and the two lighting devices 50 are each connected to lighting control device 100 according to the present embodiment.

Image reproducing device 200 reproduces and projects image content which is a still image or a moving image. More specifically, image reproducing device 200 serves as a projector that projects an image onto a wall of a room, a screen, etc.

According to the present embodiment, image reproducing device 200 is capable of reading and reproducing a plurality of image content items from a mobile recording medium such as a memory card which is attached to image reproducing device 200. It should be noted that image reproducing device 200 may include a storage device for storing a plurality of image content items. Alternatively, image reproducing device 200 may receive, through communication, a plurality of image content items transmitted by another device and reproduce the received image content items.

Moreover, a manner of connection between image reproducing device 200 and lighting control device 100 is not specifically limited. For example, image reproducing device 200 and lighting control device 100 may communicate with each other via a local area network (LAN). Alternatively, image reproducing device 200 and lighting control device 100 may be connected via a single communication cable to allow one-to-one communication. Moreover, at least part of a communication section between image reproducing device 200 and lighting control device 100 may be a radio communication section. Furthermore, a plurality of communication paths may be formed between image reproducing device 200 and lighting control device 100.

Lighting control device 100 controls lighting devices 50. According to the present embodiment, lighting control device 100 controls light emission of each of the two lighting devices 50. More specifically, the two lighting devices 50 each have a control signal line connected to lighting control device 100, and dimming control or toning control is performed according to a pulse width modulation (PWM) signal.

It should be noted that a manner of controlling lighting devices 50 is not specifically limited. The dimming control or the toning control on lighting devices 50 may be carried out according to a digital signal, for example.

Lighting control device 100 according to the present embodiment includes feature quantity calculator 110 and lighting controller 120 as basic constituent elements. The following describes a flow of basic processes performed by lighting control device 100.

As illustrated in FIG. 2, feature quantity calculator 110 calculates a feature quantity of image content to be reproduced and projected by image reproducing device 200 (S10). Lighting controller 120 controls light emission of lighting devices 50 based on the feature quantity calculated by feature quantity calculator 110 (S20).

More specifically, illumination light in a space including a projection region such as a wall, screen, and the like onto which image content is to be projected is subjected to the dimming control or the toning control. This enables easily forming an illuminated space suitable for image content to be reproduced.

It should be noted that the term "feature quantity of image content" refers to information indicating brightness, color tone, etc. of image content including a still image or a moving image, as exemplified by information calculated using a pixel value or the like indicated by data of the image content (content data). An example of a manner of calculating a feature quantity will be given later.

According to the present embodiment, feature quantity calculator 110 calculates a feature quantity of image content by obtaining and analyzing the image content. More specifically, feature quantity calculator 110 obtains, via wired communication or wireless communication, image content transmitted by image reproducing device 200 connected to lighting control device 110 and calculates a feature quantity of the image content. As described above, feature quantity calculator 110 obtains, via communication, image content of which feature quantity is to be calculated, and thus is capable of, for example, promptly calculating a feature quantity of the image content held by image reproducing device 200.

Details of a Lighting System

The following describes a configuration and an operation of lighting system 10 according to Embodiment 1, with reference to FIG. 3 to FIG. 6.

Figure 3:
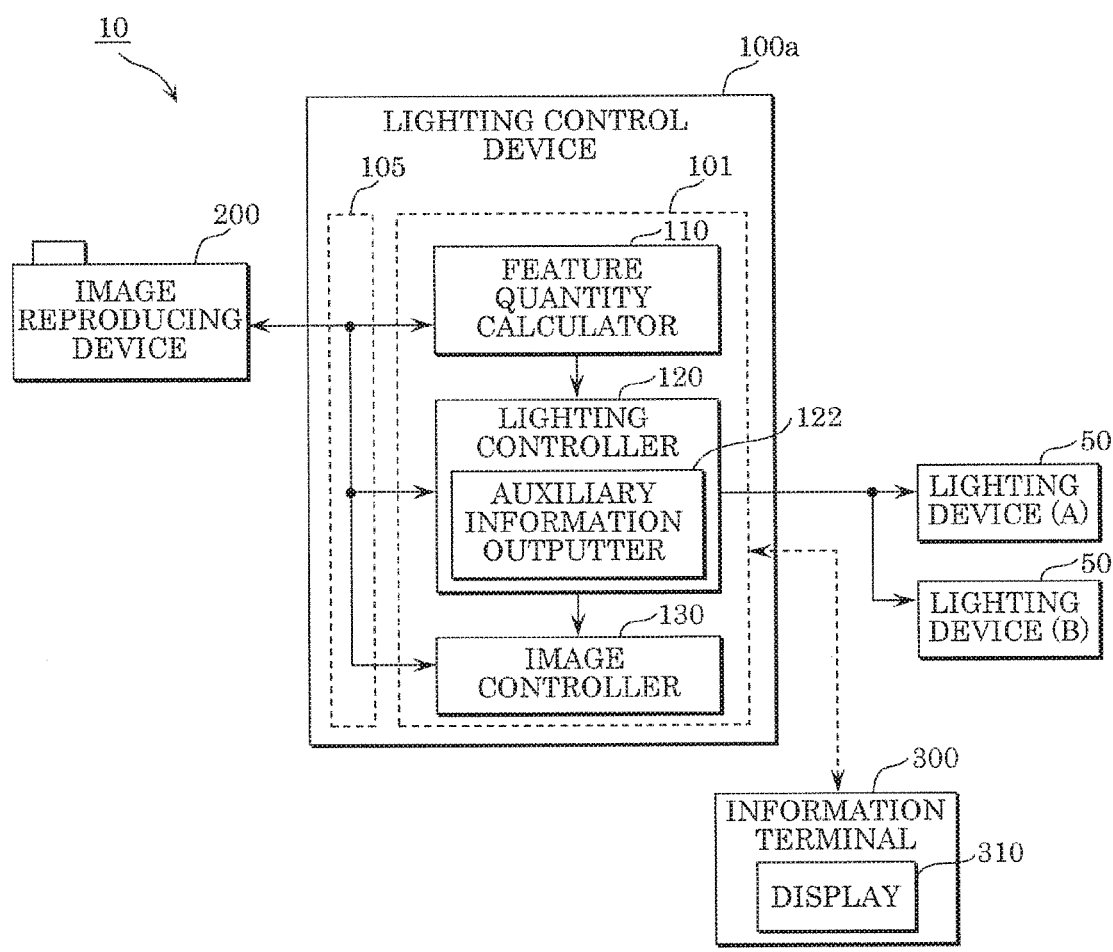
FIG. 3 is a diagram illustrating a specific configuration of the lighting system according to Embodiment 1.

FIG. 3 is a diagram illustrating a specific configuration of lighting system 10 according to Embodiment 1.

Lighting control device 100a illustrated in FIG. 3 is a specific example of lighting control device 100 illustrated in FIG. 1.

As illustrated in FIG. 3, lighting system 10 may include information terminal 300 which communicates with lighting control device 10. Examples of information terminal 300 include a mobile phone, a smartphone, a tablet, a personal computer, etc. Information terminal 300 includes display 310 on which an image based on information obtained through communication with lighting control device 100a can be displayed. In addition, lighting control device 100a and information terminal 300 can exchange information with each other via wireless communication that is compliant with the standard of, for example, Bluetooth (registered trademark), Wi-Fi (registered trademark), etc.

Lighting controller 120 included in lighting control device 100a includes auxiliary information outputter 122. Auxiliary information outputter 122 generates auxiliary information using the feature quantity calculated by feature quantity calculator 110 and outputs the auxiliary information which is for assisting determination of a value for use in controlling the light emission of lighting device 50.

Lighting control device 100a further includes image controller 130. Image controller 130 instructs image reproducing device 200 to reproduce image content. More specifically, lighting control device 100a which controls dimming and the like of lighting devices 50 has a function of controlling an operation of image reproducing device 200 which is involved in forming of an illuminated space. This enables further facilitating forming of an illuminated spate suitable for image content to be reproduced by image reproducing device 200.

Processes performed by feature quantity calculator 110, lighting controller 120, and image controller 130 which are included in lighting control device 100a are implemented by, for example, microcontroller 101 including a central processing unit (CPU), a memory, and the like, and a storage (not illustrated) which stores obtained image content, and the like. In other words, functions of feature quantity calculator 110 and the like are implemented as a result of execution of a predetermined program by microcontroller 101, such predetermined program being stored in the memory.

An example of the predetermined program is a program for controlling lighting devices 50 and causing a computer (microcontroller 101) to execute at least processes described below. The processes include calculating a feature quantity of image content to be reproduced by image reproducing device 200, and controlling light emission of lighting devices 50 based on the feature quantity calculated in the calculating.

Moreover, feature quantity calculator 110, lighting controller 120, and image controller 130 are capable of communicating with image reproducing device 200 via communicator 105.

The following describes an example of an operation performed by lighting control device 100a configured in the above-described manner. Lighting controller 120 obtains, from image reproducing device 200 via communicator 105, identification information items of a plurality of image content items, e.g., a title, a thumbnail image, etc., of image content, held by image reproducing device 200. Auxiliary information outputter 122 of lighting controller 120 generates and outputs a content list on which the obtained identification information items are listed. More specifically, auxiliary information outputter 122, in addition to the content list, generates and outputs auxiliary information items including options, item names, etc., for setting lighting conditions (dimming level and the like) of lighting devices 50. Auxiliary information outputted by auxiliary information outputter 122 is received by information terminal 300 and used for generating a settings screen.

It should be noted that "setting lighting conditions of lighting devices 50" is equivalent to, for example, inputting a value used in controlling lighting devices 50 into lighting control device 100a, inputting the value into lighting devices 50 via lighting control device 100a, or the like.

Figure 4:
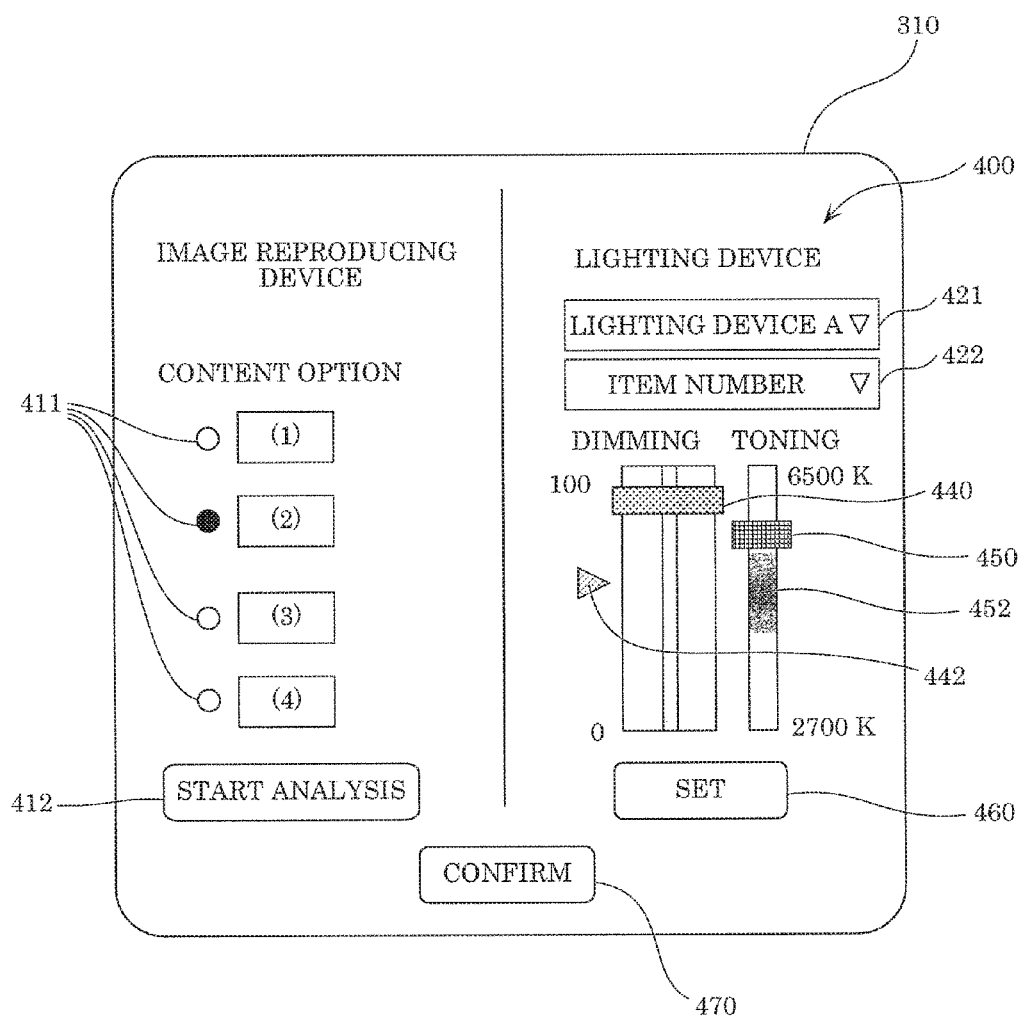
FIG. 4 is a diagram illustrating a first example of a settings screen according to Embodiment 1.

FIG. 4 is a diagram illustrating a first example of the settings screen according to Embodiment 1.

Settings screen 400 is an image which is generated by information terminal 300 using auxiliary information generated and output by auxiliary information outputter 122, and is displayed on display 310. More specifically, auxiliary information outputter 122 generates the auxiliary information for use in settings screen 400 for receiving an input of the value for use in controlling the light emission of lighting devices 50. This facilitates, for instance, configuring the settings of lighting conditions.

More specifically, a predetermined application program executed by information terminal 300 generates settings screen 400 using auxiliary information transmitted by lighting control device 100a, and causes display 310 to display generated settings screen 400. It should be noted that auxiliary information outputter 122 may generate settings screen 400 using auxiliary information and transmit generated settings screen 400 to information terminal 300. Furthermore, when lighting control device 100a includes a display such as a liquid crystal panel, settings screen 400 may be displayed on the display included in lighting control device 100a.

Settings screen 400 is a screen for receiving an input of a value for use in controlling light emission of lighting devices 50. Use of settings screen 400 displayed on display 310 of information terminal 300 that is a tablet, for example, allows a user to select image content to be reproduced by image reproducing device 200, and to set lighting conditions of each of lighting devices 50 for projecting the image content.

For example, information indicating image content which is reproducible for image reproducing device 200 (content option) is displayed on the left side of settings screen 400. In FIG. 4, information items (1) to (4) which indicate four image content items are displayed as the content options. A user can select image content which is to be reproduced by image reproducing device 200, by selecting one of radio buttons 411 respectively associated with information items (1) to (4).

The four image content items are image content items representing images having mutually different display details and color tones, as exemplified by still images such as an undersea image in color, a sunset image in color, a highland image in monochrome, and a starry sky image in monochrome.

In addition, analysis start button 412 which starts analysis of the selected image content is displayed on the lower portion of settings screen 400. Upon pressing of analysis start button 412 by a user (e.g., tapping a region of the button on display 310, hereinafter the same applies), feature quantity calculator 110 of lighting control device 100a analyzes the selected image content, as described in more detail below.

Various items for setting the lighting conditions of lighting device 50 are displayed on the right side of settings screen 400. In FIG. 4, pull-down menu 421 for selecting lighting device 50 which is a target for the settings of lighting conditions, pull-down menu 422 for selecting an item number of lighting device 50, dimming slider 440 for changing a dimming level, toning slider 450 for changing a toning level, and setting button 460 for reflecting the settings, are displayed on settings screen 400.

The following describes a flow of processes regarding selecting of image content to be reproduced and settings of lighting conditions of lighting device 50, which are carried out using settings screen 400.

A user first selects, using radio buttons 411, image content to be reproduced and projected by image reproducing device 200 from among the content options on the left side of settings screen 400. Then, the user presses analysis start button 412 to execute analysis of the image content. In the example illustrated in FIG. 4, when analysis start button 412 is pressed, information terminal 300 transmits information indicating the image content of "(2)" to lighting control device 100a. Feature quantity calculator 110 obtains and analyzes the image content of "(2)" from image reproducing device 200.

An algorithm for analyzing content is pre-stored in feature quantity calculator 110. Feature quantity calculator 110 calculates a feature quantity of image content which is a target of calculating the feature quantity, i.e., a target of reproduction (hereinafter referred to as "target content").

As an example, feature quantity calculator 110 obtains an average luminance of the target content, which is an example of the feature quantity of the target content. For example, a numerical value within a range of 0 to 255 is calculated as the average luminance. It should be noted that, when the target content is a color image, a generally known conversion equation from RGB to YUV may be used. Furthermore, feature quantity calculator 110 obtains an average luminosity of the target content when the target content is a monochrome image. For example, a numerical value within a range of 0 to 255 is calculated as the average luminosity. The average luminance may be calculated based on a mathematical average of individual pixel values, blocks of pixel values, etc. Also, in the case of the selected target content representing moving images being produced by the image reproducing device 200, the average luminance may be calculated across a number of successive frames, etc. (as discussed below in relation to FIG. 6).

Feature quantity calculator 110 is further capable of obtaining an average illuminance of the target content which image reproducing device 200 projects, by multiplying luminous flux of light emitted by image reproducing device 200 by "average luminance value/255", and dividing the result of multiplying by an area of the projection region. As described above, feature quantity calculator 110 calculates an average luminance of the target content, which is an example of the feature quantity of the target content.

Next, lighting controller 120 of lighting control device 100a controls light emission of lighting devices 50 based on the feature quantity of the calculated target content. For example, lighting controller 120 adjusts a dimming level of lighting devices 50 to obtain an illuminance substantially equivalent to the average illuminance of the target content.

For example, assume the case where a user selects lighting device A that is lighting device 50 labeled as "A" (see FIG. 3) and an item number of lighting device A as illustrated in FIG. 4. It should be noted that the average illuminance of a place illuminated by lighting device A is obtainable by simulation or measurement, and the average illuminance of lighting device A at the time of full lighting is pre-stored in lighting control device 100a. Moreover, information indicating a relationship between the dimming level of lighting device A and the luminous flux is also pre-stored in lighting control device 100a in the form of a data table. Lighting controller 120 of lighting control device 100a calculates, based on the above-described information items, a dimming level at which an illuminance substantially equivalent to the feature quantity of the target content (average illuminance) is obtainable by the lighting device A, and thereby calculates a recommended value of the dimming level.

Auxiliary information outputter 122 of lighting controller 120 generates and outputs auxiliary information to information terminal 300 to display, next to dimming slider 400 of settings screen 400, a triangle mark indicating the calculated recommended value of the dimming level. As a result, triangle mark 442 indicating the recommended value of the dimming level is displayed on settings screen 400 as illustrated in FIG. 4.

A user positions dimming slider 440 to correspond to triangle mark 442, for example, and presses setting button 460. This determines a dimming level corresponding to the position of dimming slider 440 as a value which is used in controlling light emission of lighting device A. Furthermore, the user presses confirmation button 470. This causes image reproducing device 200 to reproduce and project the target content, and lighting device A to illuminate a space at the dimming level which has been set.

More specifically, pressing of confirmation button 470 causes the information terminal 300 to communicate with the lighting controller 120, which in turn causes an instruction for reproducing the target content to be transmitted from image controller 130 of lighting control device 100a to image reproducing device 200, and image reproducing device 200 reproduces and projects the target content according to the instruction. Furthermore, a PWM signal corresponding to the dimming level indicated by dimming slider 440 is transmitted from lighting controller 120 to lighting device A, changing brightness of lighting device A to correspond to the dimming level.

In this manner, lighting controller 120 is capable of controlling the light emission of lighting device 50 (lighting device A in the example described above) using a setting value (dimming level in the example described above) that is a value input to lighting controller 120 in accordance with the auxiliary information. In other words, lighting controller 120 efficiency controls lighting device 50.

According to the above-described processes, dimming of lighting device 50 is controlled based on a feature quantity of target content, and an illuminated space that is illuminated by lighting device 50 is formed. In other words, an illuminated space suitable for an image to be reproduced by image reproducing device 200 is easily formed. In addition, a user can make a final determination on suitability of the illuminated space. When the illuminated space does not match the user's preference, it is possible to perform fine adjustment of lighting conditions by, for example, moving dimming slider 400 and pressing setting button 460 and confirmation button 470.

Furthermore, when lighting device 50 is a lighting device whose color temperature is controllable, lighting control device 100a is also capable of controlling a color temperature (i.e., performing toning control) of lighting device 50 according to a feature quantity of image content to be reproduced by image reproducing device 200. When, for example, a user selects image content that is a still image of sunset as target content, and presses analysis start button 412, processes described below are performed.

Feature quantity calculator 110 of lighting control device 100a converts an RGB value of each pixel of image data corresponding to the still image of sunset into x and y coordinates of a chromaticity diagram. For example, a generally known conversion equation is used for the conversion. Feature quantity calculator 110 obtains a frequency distribution from a result of the conversion, and identifies a value of a highest frequency. Feature quantity calculator 110 further obtains a correlated color temperature from the identified value. For example, a color temperature along the black body locus which is closest to a color that is largest in number in the image data of sunset is obtained. The value of the correlated color temperature obtained as described above is an example of a feature quantity calculated by feature quantity calculator 110.

When a user selects lighting device A and an item number of lighting device A as illustrated in FIG. 4, lighting controller 120 of lighting control device 100a calls a data table of a color temperature range of a light source corresponding to the item number and a toning signal, which is pre-stored in lighting control device 100a.

Auxiliary information outputter 122 of lighting controller 120 generates auxiliary information for displaying, on settings screen 400, information indicating the value of the correlated color temperature calculated by feature quantity calculator 110. In the example illustrated in FIG. 4, range image 452 which indicates a recommended range centering around the value of the calculated correlated color temperature is displayed on settings screen 400. It should be noted that, for example, a range of 20% above or below the value of the calculated correlated color temperature is adopted as the recommended range.

A user positions toning slider 450 in the recommended range indicated in range image 452, and presses setting button 460. This determines a toning level corresponding to the position of toning slider 450 as a value which is used in controlling light emission of lighting device A. The user further presses confirmation button 470. This causes image reproducing device 200 to project the still image of sunset that is the target content, and lighting device A to illuminate a space at the set toning level.

More specifically, pressing of confirmation button 470 causes an instruction for reproducing the still image of sunset that is the target content to be transmitted from image controller 130 of lighting control device 100a to image reproducing device 200, and image reproducing device 200 reproduces and projects the still image of sunset according to the instruction. Furthermore, a PWM signal corresponding to the toning level indicated by toning slider 450 is transmitted to lighting device A, thereby changing a color temperature of lighting device A to correspond to the toning level.

According to the above-described processes, dimming of lighting device 50 is controlled based on a feature quantity of target content, and an illuminated space that is illuminated by lighting device 50 is formed. In other words, an illuminated space suitable for an image to be reproduced by image reproducing device 200 is easily formed. In addition, a user can make a final determination on suitability of the illuminated space. When the illuminated space does not match the user's preference, it is possible to perform fine adjustment of lighting conditions by, for example, moving toning slider 450 and pressing setting button 460 and confirmation button 470.

It should be noted that although the above has described the case where settings for the dimming of lighting device 50 and settings for the toning of lighting device 50 are separately performed, dimming and toning may be set simultaneously. For example, settings screen 400a illustrated in FIG. 5 may be generated using auxiliary information generated and output by lighting controller 120 of lighting control device 100a.

Figure 5:
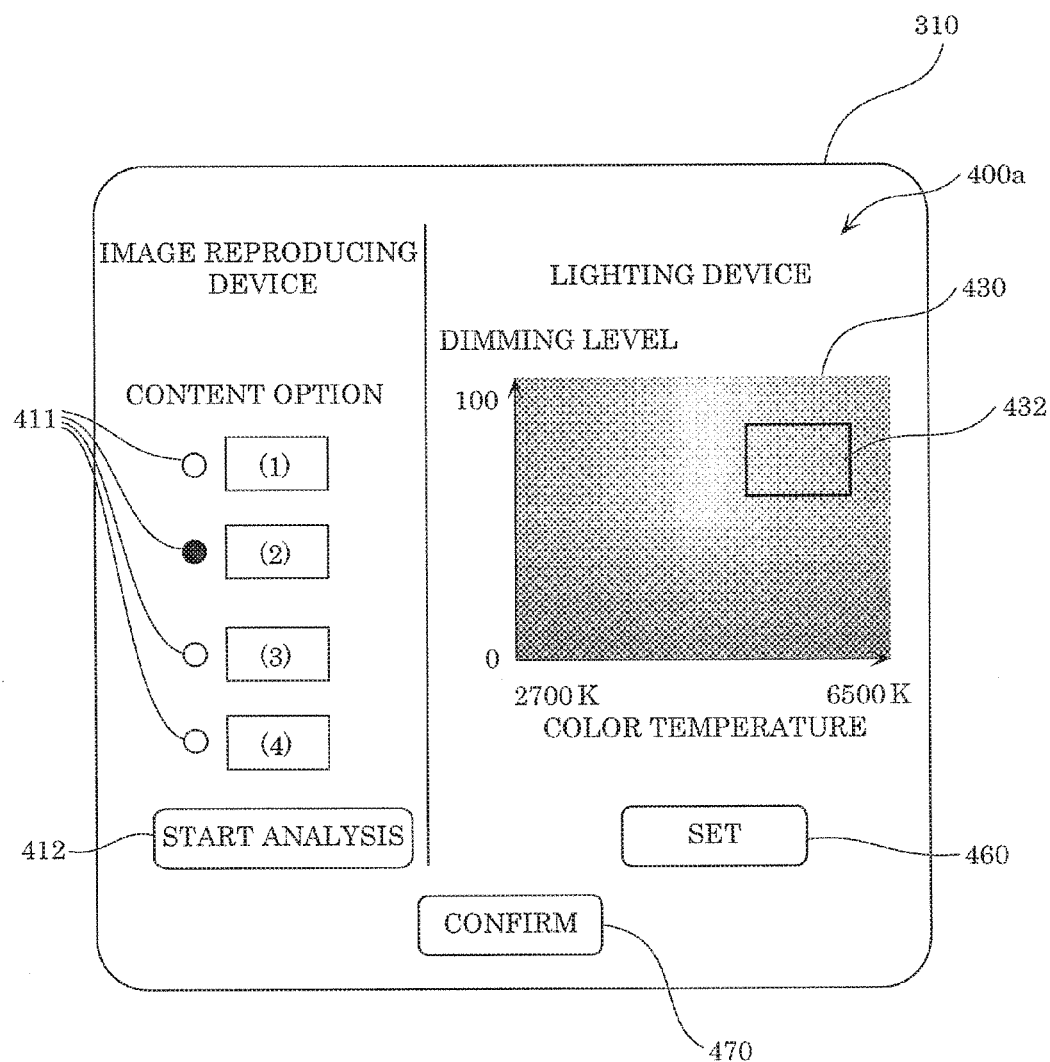
FIG. 5 is a diagram illustrating a second example of the settings screen according to Embodiment 1.

FIG. 5 is a diagram illustrating a second example of the settings screen according to Embodiment 1. In settings screen 400a illustrated in FIG. 5, two-dimensional settings section 430 including a color temperature axis and a dimming level axis is displayed. In two-dimensional settings section 430, range image 432 which represents, in a two-dimensional domain, a color temperature range and a dimming level range which are recommended is indicated.

Range image 432 as described above is generated based on a feature quantity which feature quantity calculator 110 of lighting controller 120 has obtained as a result of the above-described analysis performed on the target content specified by selecting from radio buttons 411.

More specifically, settings screen 400a including two-dimensional settings section 430 and range image 432 is, as with settings screen 400 described above, generated by information terminal 300 using auxiliary information generated by auxiliary information outputter 122 of lighting controller 120, and displayed on display 310. Alternatively, auxiliary information outputter 122 of lighting controller 120 may generate settings screen 400a and transmit, to information terminal 300, settings screen 400a generated.

A user selects, by tapping operation or the like, a position in range image 432 in two-dimensional settings section 430 of settings screen 400a, and presses setting button 460. The user lastly presses confirmation button 470, causing image reproducing device 200 to reproduce and project the target content, and lighting device A to illuminate a space at the dimming level and the toning level which have been set using two-dimensional settings section 430.

More specifically, pressing of confirmation button 470 causes an instruction for reproducing the target content to be transmitted from image controller 130 of lighting control device 100a to image reproducing device 200, and image reproducing device 200 reproduces and projects the target content according to the instruction. Furthermore, PWM signals respectively corresponding to the dimming level and the toning level which correspond to the position selected using two-dimensional settings section 430 are transmitted to lighting device A. This changes the brightness and the color temperature of lighting device A to correspond to the dimming level and the toning level, respectively.

According to the above-described processes, dimming and toning of lighting device 50 is controlled based on a feature quantity of target content, and an illuminated space that is illuminated by lighting device 50 is formed. In other words, an illuminated space suitable for an image to be reproduced by image reproducing device 200 is easily formed. In addition, a user can make a final determination on suitability of the illuminated space. When the illuminated space does not match the user's preference, it is possible to perform fine adjustment of lighting conditions by, for example, changing the selected position in two-dimensional settings section 430 and pressing setting button 460 and confirmation button 470.

As described above, according to the present embodiment, auxiliary information outputter 122 generates and outputs the auxiliary information including information indicating either one of a recommended value and a recommended range for the value for use in controlling the light emission of lighting device 50, the either one of a recommended value and a recommended range being determined according to the feature quantity. With this, a value of a dimming level or a toning level or a range of a dimming level or a toning level, which is suitable for the target content is presented to a user, as illustrated in FIG. 4 and FIG. 5. This enables further efficient control, based on the feature quantity, on light emission of lighting apparatus 50 for forming an illuminated space suitable for the target content.

It should be noted that the recommended value or the recommended range displayed on a screen such as settings screen 400 may be indicated as a numerical value instead of a position or a size of an image such as triangle mark 442 or range image 452. Furthermore, a dimming level or a toning level may be input to information terminal 300 using, for example, a numerical value indicating the dimming level or the toning level, instead of using an image such as a slider. In this case, a user who is familiar with lighting design, for example, can input into information terminal 300 a dimming level or a toning level using a numerical value according to a numerical value indicating a recommended value or a recommended range. In other words, it is possible to adjust an illuminated space more precisely.

The above has described control on light emission of lighting device 50 when image content to be reproduced and projected by image reproducing device 200 is a still image. However, even when the image content is a moving image, lighting control device 100a is capable of controlling light emission of lighting device 50 based on a feature quantity of the moving image.

Figure 6:
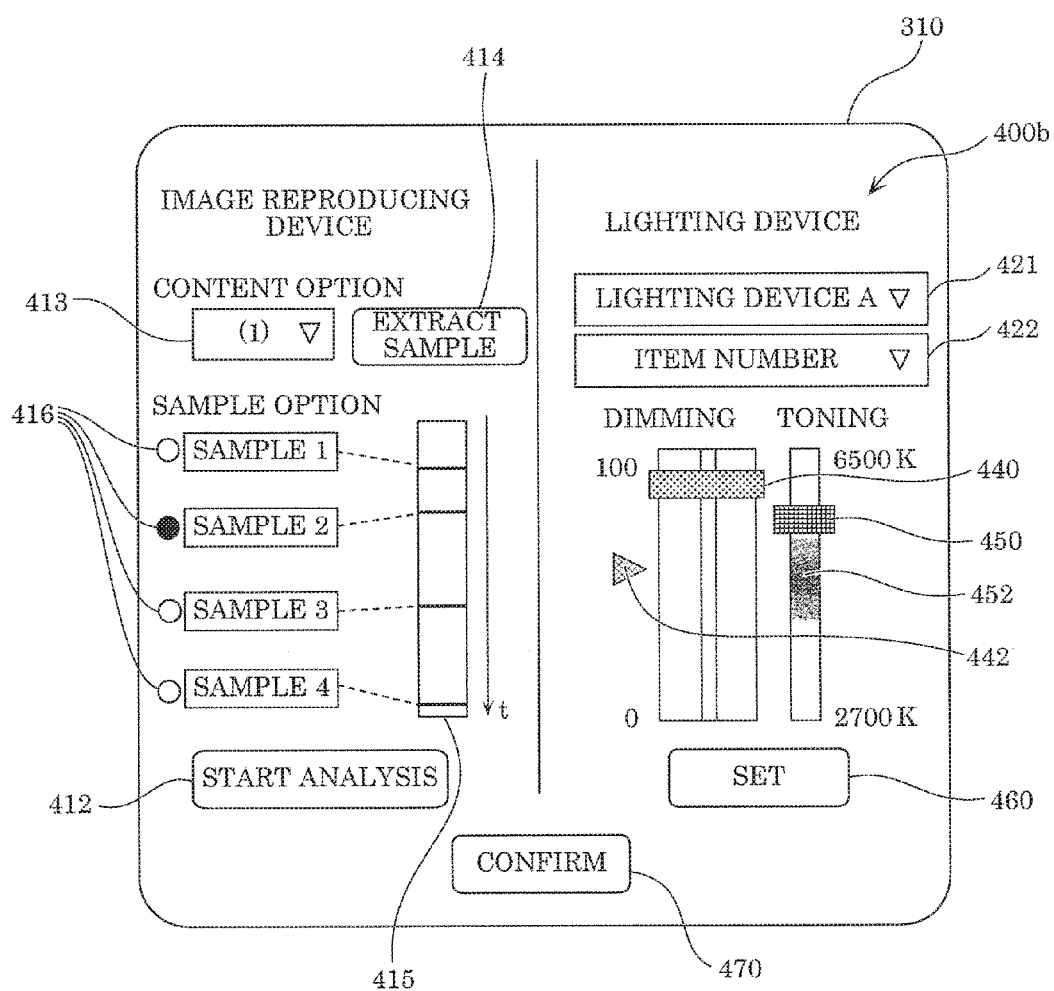
FIG. 6 is a diagram illustrating a third example of the settings screen according to Embodiment 1.

FIG. 6 is a diagram illustrating a third example of the settings screen according to Embodiment 1. FIG. 6 illustrates settings screen 400b on which pull-down menu 413 for selecting one of a plurality of image content items, sample extracting button 414, radio buttons 416 respectively associated with a plurality of samples, time position information 415 indicating a time position of each of the samples in a moving image, and analysis start button 412 are displayed on the left side.

A user first selects image content to be reproduced and projected by image reproducing device 200 using pull-down menu 413, and presses sample extracting button 414. In lighting control device 100a, feature quantity calculator 110, for example, extracts as a sample at least one frame for adjusting an illuminated space, from among a plurality of frames included in the selected image content (target content).

Feature quantity calculator 110, for example, calculates an average luminance for each of the frames, and selects frames respectively corresponding to an average value, a maximum value, a minimum value, and a median value, from among the plurality of frames. Furthermore, feature quantity calculator 110 notifies auxiliary information outputter 122 of lighting controller 120 of information related to each of the selected frames. Auxiliary information outputter 122 generates, using the information related to each of the frames, auxiliary information such that radio buttons 416 respectively associated with the frames, time position information 415, etc., are displayed on settings screen 400b.

The user selects a sample to be used for adjusting the illuminated space, by selecting one of radio buttons 416 displayed on settings screen 400b. Furthermore, the user presses analysis start button 412 displayed on settings screen 400b. This causes feature quantity calculator 110 of lighting control device 100a to analyze the target content, thereby calculating a feature quantity of the target content.

More specifically, feature quantity calculator 110 selects at least one frame from among a plurality of frames included in the image content that is a moving image, and calculates the feature quantity using the at least one frame. As described above, a feature quantity of target content is calculated using a selected frame, thereby making it possible, for example, to efficiently calculate the feature quantity.

The manner of calculating a feature quantity is as described above, and at least one of a value of an average illuminance and a value of a correlated color temperature which correspond to at least one selected frame is calculated as the feature quantity.

It should be noted that a manner of selecting at least one frame to be used by feature quantity calculator 110 in calculating a feature quantity is not specifically limited. For example, a frame at the first time position, a frame at the central time position, or a frame at the last time position in target content may be selected as a frame to be used in calculating a feature quantity. As described above, by selecting a frame in a simple manner, it is possible to reduce the processing load required for calculating a feature quantity of target content that is a moving image, for example.

Alternatively, an average illuminance of target content which is a feature quantity of the target content may be calculated by calculating an average value of average luminance values obtained by calculating a luminance value for each of the frames in the above-described processing of sample extracting, and using the calculated average value. This enables, for example, calculating a feature quantity taking all of the frames of target content into consideration.

Auxiliary information outputter 122 of lighting controller 120 generates and outputs auxiliary information using the feature quantity calculated by feature quantity calculator 110, such that triangle mark 442, dimming slider 440, etc. illustrated in FIG. 6 are displayed on settings screen 400b.

A user selects lighting device 50 and an item number on settings screen 400b. Furthermore, the user operates at least one of dimming slider 440 and toning slider 450, presses setting button 460, and then presses confirmation button 470.

As a result, image reproducing device 200 reproduces and projects a sample which is currently selected, and lighting device 50 which has been selected (lighting device A in FIG. 6) illuminates a space at the set dimming level and toning level.

More specifically, pressing of confirmation button 470 causes information indicating the selected sample (sample 2 in FIG. 6) to be transmitted from information terminal 300 to lighting control device 100a. Furthermore, PWM signals respectively corresponding to the dimming level and the toning level indicated by dimming slider 440 and toning slider 450 are transmitted from lighting controller 120 to lighting device A.

Image controller 130 of lighting control device 100a transmits to image reproducing device 200 an instruction for reproducing sample 2 which is selected. Image reproducing device 200 reproduces and projects an image (still image) of sample 2 included in target content, according to the instruction. Furthermore, brightness and a color temperature of lighting device A are changed to correspond to the dimming level and the toning level, respectively.

When the user changes the sample to be selected, for example, from sample 2 to sample 3 in the list of sample selection in settings screen 400b, and presses confirmation button 470, information indicating sample 3 is transmitted from information terminal 300 to lighting control device 100a. As a result, a still image to be reproduced and projected by image reproducing device 200 is switched from sample 2 to sample 3.

As described above, when the target content is a moving image, image controller 130 is capable of instructing reproduction of each of the at least two frames selected from among a plurality of frames included in the target content. This enables switching between still images (sample frames) to be reproduced and projected in an illuminated space formed under the lighting conditions which have been set according to the feature quantity of target content. This allows a user to, for example, efficiently checking whether or not the lighting conditions are suitable for the target content item which is a moving image. This contributes to facilitating forming of an illuminated space suitable for an image to be reproduced by image reproducing device 200.

Embodiment 2

Various processes executed by lighting control device 100 or 100a according to Embodiment 1 described above can be executed by, for example, a plurality of devices which are physically separated. The following describes, as Embodiment 2, lighting system 10a including two devices which implement functions equivalent to the functions of lighting control device 100 or 100a, focusing on differences from Embodiment 1 described above.

Figure 7:
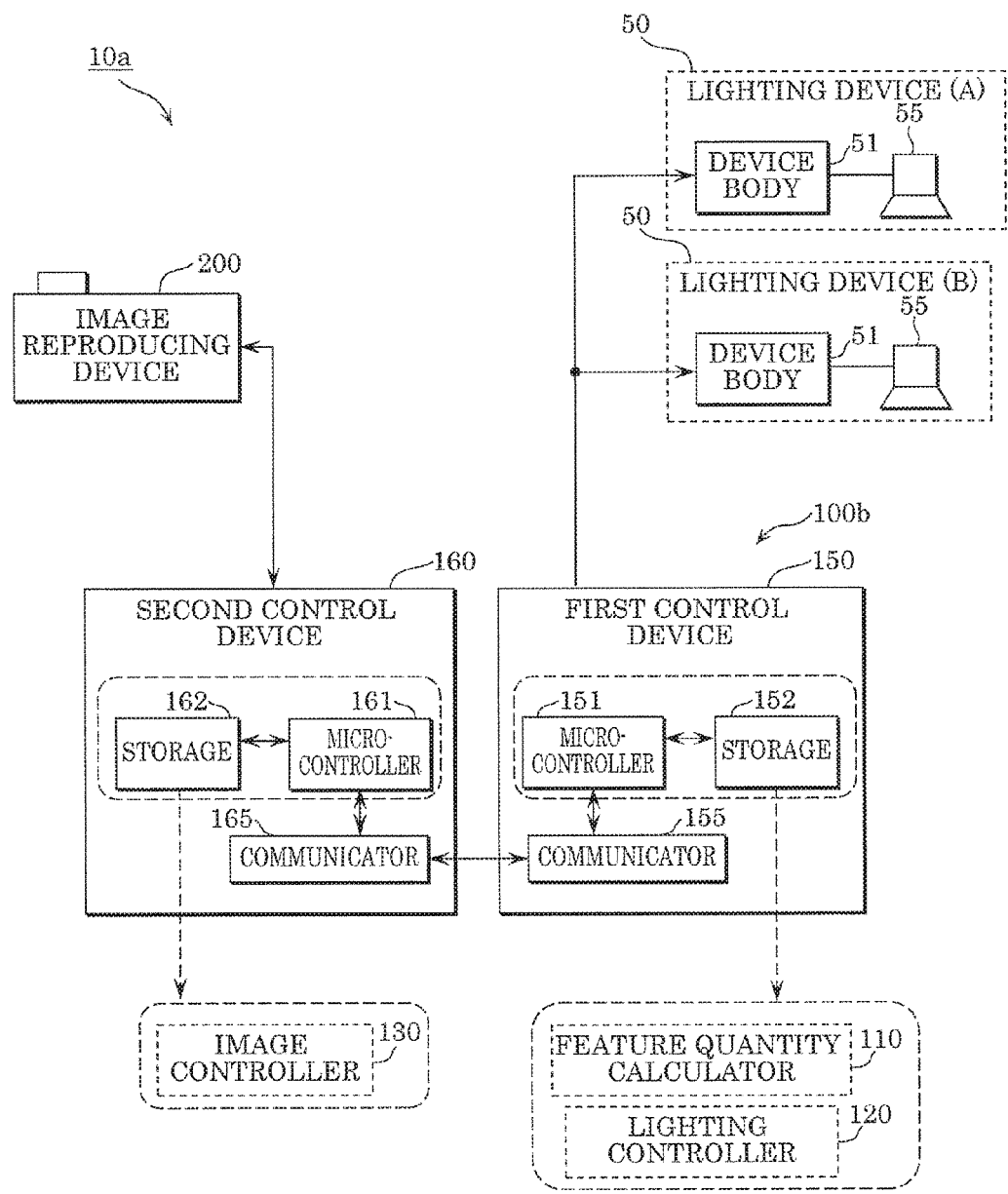
FIG. 7 is a diagram illustrating a configuration of a lighting system according to Embodiment 2.

FIG. 7 is a diagram illustrating a configuration of lighting system 10a according to Embodiment 2. Lighting system 10a illustrated in FIG. 7 includes lighting control device 100a, and lighting control device 100a includes first control device 150 and second control device 160.

Lighting control device 100a is a device which calculates a feature quantity of image content to be reproduced and projected by image reproducing device 200, and controls light emission of lighting device 50 based on the feature quantity which has been calculated. In this regard, lighting control device 100a has a common feature with lighting control device 100 according to Embodiment 1 described above.

However, lighting control device 100a is different from lighting control device 100 according to Embodiment 1 described above, in that lighting control device 100a includes two devices (first control device 150 and second control device 160) which are physically separate and can communicate with each other.

First control device 150 includes microcontroller 151, storage 152, and communicator 155. Second control device 160 includes microcontroller 161, storage 162, and communicator 165.

Microcontroller 151 and storage 152 included in first control device 150 implement the functions of, for example, feature quantity calculator 110 and lighting controller 120 described above in Embodiment 1. More specifically, in first control device 150, microcontroller 151 executes a program for controlling lighting device 50 which has been described above in Embodiment 1, thereby implementing the functions of feature quantity calculator 110 and lighting controller 120.

In addition, microcontroller 151 and storage 152 included in first control device 150 implement the functions of, for example, image controller 130 described above in Embodiment 1.

Furthermore, first control device 150 is capable of exchanging information with second control device 160 via communicator 155, and second control device 160 is capable of exchanging information with first control device 150 via communicator 165. In other words, processes of transmitting and receiving information for selecting image content to be reproduced by image reproducing device 200 and processes of transmitting and receiving information used by first control device 150 for obtaining the image content are performed via communicators 155 and 165. For that reason, lighting control device 100a according to the present embodiment is capable of performing, for example, substantially the same processes as the processes performed by lighting control device 100 illustrated in FIG. 3.

In addition, when first control device 150 and second control device 160 each have a display, for example, the details corresponding to the various settings screens illustrated in FIG. 4 to FIG. 6 may be displayed by the two displays.

Figure 8:
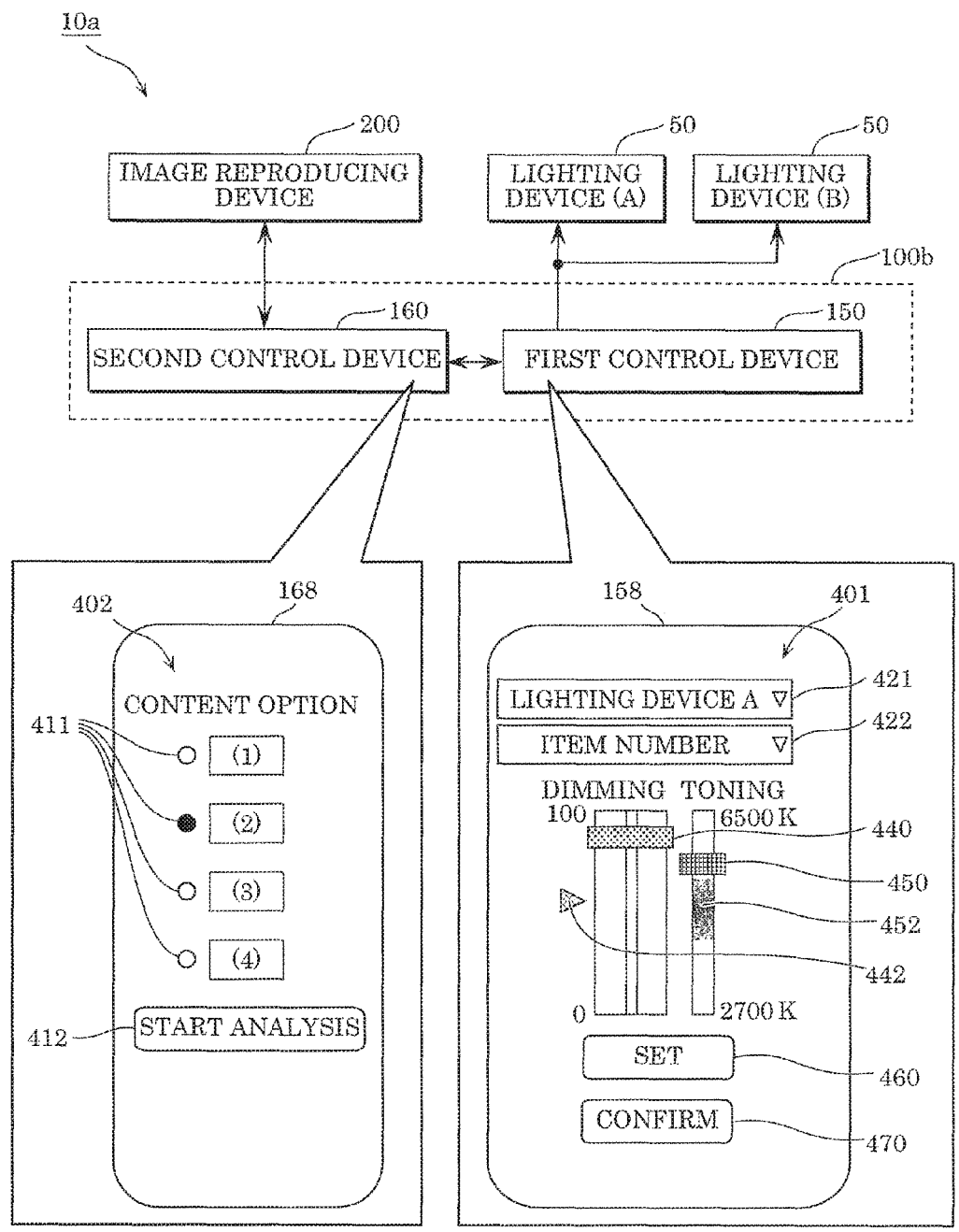
FIG. 8 is a diagram illustrating examples of the settings screen respectively displayed by a first control device and a second control device according to Embodiment 2.

FIG. 8 is a diagram illustrating an example of settings screens displayed respectively by first control device 150 and second control device 160 according to Embodiment 2.

For example, a portion including the content options in settings screen 400 illustrated in FIG. 4 is displayed as settings screen 402 on display 168 of second control device 160. Furthermore, a portion related to the lighting control in settings screen 400 illustrated in FIG. 4 is displayed as settings screen 401 on display 158 of first control device 150.

As described above, for example, even when settings screen 400 is displayed on physically different two displays (158 and 168), a user can select image content to be reproduced, using settings screen 402 of display 158. Furthermore, first control device 150 is capable of obtaining the selected image content via second control device 160, and thus first control device 150 is capable of calculating a feature quantity and generating auxiliary information based on the calculated feature quantity. This enables first control device 150 to cause display 158 to display settings screen 401. In other words, the user can set, using settings screen 401, lighting conditions suitable for the image content selected on settings screen 402. For that reason, lighting control device 100a according to the present embodiment enables easily forming an illuminated space suitable for an image to be reproduced by image reproducing device 200, as with lighting control device 100 according to Embodiment 1 described above.

It should be noted that settings screens 401 and 402 may each be displayed on a display included by a terminal device such as information terminal 300 capable of communicating with first control device 150 and second control device 160. In other words, in lighting system 10a according to the present embodiment, selecting of image content to be reproduced and configuring the settings of lighting conditions of lighting device 50 may be performed via information terminal 300 that is a smartphone, a tablet, or the like.

Other Embodiments

Although the lighting control device and the lighting system according to the present disclosure are described based on Embodiment 1 and Embodiment 2, the present disclosure is not limited to Embodiment 1 and Embodiment 2.

For example, the settings screen (400, etc., the same holds for the description below) need not be used for the both settings for the dimming level and the toning level. For example, toning slider 450 and images related to toning slider 450 need not be displayed in settings screen 400. In other words, it is sufficient that lighting control devices 100a and 100b perform at least one of dimming control and toning control.

In addition, for example, the dimming level or the toning level of lighting device 50 may change to the values set using the settings screen (400, etc., the same holds for the description below) at a different time from a time when confirmation button 470 is pressed. For example, the dimming level of lighting device 50 may change in synchronization with moving of dimming slider 440. This allows a user to promptly check a result of changing, by the user, lighting conditions such as the dimming level, etc.

Furthermore, for example, lighting controller 120 of lighting control devices 100, 100a, and 100b may control the dimming level or the toning level of lighting device 50 using a recommended value when the recommended value based on the feature quantity of target content item is calculated. In this case, brightness or a color temperature of lighting apparatus 50 changes so as to be suitable for the feature quantity of target content, without an operation on a settings screen performed by the user. Furthermore, a settings screen is updated at this time such that a pointer such as a dimming slider of the settings screen is displayed at a position indicated by the recommended value. The user can subsequently perform fine adjustment, using the settings screen, of brightness or a color temperature of lighting device 50 according to the user's preference, for example.

In addition, for example, although the various functions of lighting control devices 100, 100a, 100b are implemented by executing a predetermined program by microcontroller 101, various functions such as calculating a feature quantity may be implemented by a dedicated circuit provided for each of the functions.

Furthermore, for example, the total number of lighting devices 50 included in each of lighting systems 10 and 10a need not be two. Lighting systems 10 and 10a may each include only one lighting device 50, or three or more lighting devices 50. In addition, lighting control devices 100 and 100a may perform the dimming control or the toning control collectively on a plurality of lighting devices 50. In other words, the total number of lighting devices 50 may be determined according to a use application, shape, or the like of a space which lighting system 10 or lighting system 10a is placed. Even in this case, lighting control devices 100 and 100a each exert advantageous effects such as facilitating forming of an illuminated space suitable for an image to be reproduced.

Furthermore, lighting control devices 100, 100a, and 100b may calculate a feature quantity of image content without using the image content. Lighting control devices 100, 100a, and 100b may calculate a feature quantity of image content using, for example, data which is decimated from original data that is data of the image content and is transmitted from image reproducing device 200. This reduces the processing loads on lighting control devices 100, 100a, and 100b which are required for calculating a feature quantity, for example.

Furthermore, lighting control devices 100, 100a, and 100b need not obtain image content via communications. For example, image content may be obtained via a mobile recording medium such as a memory card.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device which controls a lighting device, the lighting control device comprising:
   a calculator which calculates a feature quantity of image content to be reproduced and projected using a light source different from the lighting device by an image reproducing device; and
   a lighting controller which controls light emission of the lighting device based on the feature quantity calculated by the calculator.

2. The lighting control device according to claim 1,
   wherein the lighting controller includes an auxiliary information outputter which generates auxiliary information using the feature quantity calculated by the calculator and outputs the auxiliary information, the auxiliary information being for assisting determination of a value based upon which the lighting controller controls the light emission of the lighting device.

3. The lighting control device according to claim 2,
   wherein the auxiliary information outputter generates and outputs the auxiliary information suitable for display on a settings screen from which the lighting controller is configured to receive, as an input, the value based upon which the lighting controller controls the light emission of the lighting device.

4. The lighting control device according to claim 2,
   wherein the auxiliary information outputter generates and outputs the auxiliary information including information indicating at least one of a recommended value and a recommended range for the value based upon which the lighting controller controls the light emission of the lighting device, the at least one of a recommended value and a recommended range being determined according to the feature quantity.

5. The lighting control device according to claim 2,
   wherein the lighting controller controls the light emission of the lighting device based on a setting value that is a value input to the lighting controller in accordance with the auxiliary information.

6. The lighting control device according to claim 1,
   wherein the calculator selects at least one frame from among a plurality of frames included in the image content that is a moving image, and calculates the feature quantity using the at least one frame.

7. The lighting control device according to claim 1, further comprising
   an image controller configured to instruct the image reproducing device to reproduce the image content.

8. The lighting control device according to claim 7,
   wherein when the image content is a moving image, the image controller configured to instruct the image reproducing device to reproduce at least two frames selected from among a plurality of frames included in the image content.

9. The lighting control device according to claim 1,
   wherein the calculator obtains the image content and calculates the feature quantity based on the image content.

10. The lighting control device according to claim 9, further comprising
    a communicator which communicates with the image reproducing device,
    wherein the calculator obtains the image content transmitted by the image reproducing device, via the communicator.

11. A lighting system comprising
    the lighting control device, the lighting device, and the image reproducing device according to claim 1.

12. A non-transitory computer-readable recording medium having a program stored thereon which, when executed by a computer, causes the computer to:
    calculate a feature quantity of image content to be reproduced and projected by an image reproducing device; and
    control light emission of the lighting device based on the feature quantity calculated in the calculating.

13. A lighting control device which controls a lighting device, the lighting control device comprising:
    a calculator which calculates a feature quantity of image content to be reproduced and projected by an image reproducing device; and
    a lighting controller which controls light emission of the lighting device based on the feature quantity calculated by the calculator, wherein the lighting controller includes an auxiliary information outputter which generates auxiliary information using the feature quantity calculated by the calculator and outputs the auxiliary information, the auxiliary information being for assisting determination of a value based upon which the lighting controller controls the light emission of the lighting device, and wherein the auxiliary information outputter generates and outputs the auxiliary information including information indicating at least one of a recommended value and a recommended range for the value based upon which the lighting controller controls the light emission of the lighting device, the at least one of a recommended value and a recommended range being determined according to the feature quantity.

* * * * *